United States Patent
Ohkubo

(10) Patent No.: US 6,816,181 B2
(45) Date of Patent: Nov. 9, 2004

(54) IMAGE FORMING DEVICE

(75) Inventor: Kazunobu Ohkubo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/188,117

(22) Filed: Jul. 3, 2002

(65) Prior Publication Data
US 2003/0048351 A1 Mar. 13, 2003

(30) Foreign Application Priority Data
Jul. 4, 2001 (JP) ........................................ 2001-203558

(51) Int. Cl.⁷ .............................. B41J 2/385; B41J 2/45
(52) U.S. Cl. ..................................... 347/238; 347/130
(58) Field of Search ................................ 347/130, 131, 347/238, 240, 251, 254, 244, 258, 241, 256; 359/619

(56) References Cited

U.S. PATENT DOCUMENTS 5,812,176 A * 9/1998 Kawabe et al. ............. 347/240
5,835,119 A * 11/1998 Samuels ..................... 347/238
6,034,712 A * 3/2000 Iwasaki ...................... 347/241
6,583,805 B2 * 6/2003 Mashimo et al. ........... 347/241

FOREIGN PATENT DOCUMENTS

| JP | 10-172756 | 6/1998 |
| JP | 11-354271 | 12/1999 |
| JP | 2000-077188 | 3/2000 |

* cited by examiner

Primary Examiner—Hai C. Pham
(74) Attorney, Agent, or Firm—Sughrue Mion, PLLC

(57) ABSTRACT

An image forming device comprises a print head in which an array pitch of organic EL elements arranged in a main-scanning direction is at least twice the size of a light-emitting portion of one organic EL element, an aperture diameter of a microlens is no more than the array pitch, and the aperture diameter has an area that is larger than that of the light-emitting portion of the organic EL element. After the exposure of a photosensitive material onto the emitted light from the organic EL element, the photosensitive material is moved for each movement by moving the print head in the main-scanning direction by a predetermined amount to fill a space between exposure spots at which mutually adjacent organic EL elements are focused, and divide exposure of one main-scanning line of the photosensitive material into a plurality of exposures without leaving any space.

16 Claims, 11 Drawing Sheets

IMAGE FORMING DEVICE

BACKGROUND OF THE INVENTION

1. Field of the Invention

The present invention relates to an image forming device, and more particularly, to an image forming device in which an image is formed by exposing an object with an exposure device in which an organic Electro-Luminescence (EL) element is used as a light-emitting element.

2. Description of the Related Art

An organic electric field light-emitting element that employs a fluorescent organic substance as a material for a light-emitting layer is referred to as an 'organic Electro-Luminescence (EL) element'. Since the organic EL element has such advantages that manufacturing thereof is more facilitated than other light-emitting elements and a thin and light weight light-emitting element can be formed, the organic EL element has conventionally been studied and developed as a thin type display element. In recent years, a high performance organic EL element, which is comparable with a light-emitting diode (LED) in terms of light-emitting luminance, light-emitting efficiency, durability, and the like, has been developed. Therefore, application has been studied of an organic EL element to an exposure head for exposing a photosensitive material such as a silver halide photosensitive material.

Typically, an organic compound layer comprises a transparent substrate, and an organic compound, and a pair of electrode layers (a cathode layer and an anode layer) for interposing the organic compound layer therebetween that are layered on the transparent substrate. The emitted light is outputted from the transparent substrate side. However, since the emitted light is a diffusing light source, and is also reflected from a surface of the transparent substrate, a problem is caused in that light outputting efficiency is low, thus making it difficult to obtain sufficient exposure amount.

Conversely, Japanese Patent Application Laid-Open (JP-A) No. 10-172756 discloses an organic EL light-emitting device in which a microlens is placed on the organic EL element between a light-emitting layer, and a light outputting surface of the transparent substrate so as to correspond to each other 1 to 1 to thereby improve the light outputting efficiency and increase light-emitting luminance in the direction of optical axis. Further, JP-A No. 11-354271 discloses a photosensitive material recording device in which an organic EL element array is formed on a substrate having a microlens to improve availability of the emitted light amount. Moreover, JP-A No. 2000-77188 discloses an exposure device and an image forming device in which an organic EL element array having microlens and an optical resonator structure is used, and wavelength at the light-emitting peak wavelength is put within a region of a half width of the sensitivity of a photosensitive member to improve availability of the emitted light amount.

However, when the area of aperture of the microlens is the same as that of a light-emitting portion of the organic EL element, a problem is caused in that the emitted light cannot be converged sufficiently, whereby an amount in which light is exposed becomes insufficient. Further, a problem is also caused in that, since the organic EL element is a diffusing light source, if the area of the microlens aperture and that of the light-emitting portion of the organic EL element are the same, crosstalk may occur. On the other hand, such problems can be solved by making the area of the microlens aperture larger than that of the light-emitting portion of the organic EL element. However, if the area of the microlens aperture is made larger, a problem is caused in that a layout space, i.e. a pixel pitch between the organic EL elements is extended, unexposed portions are produced on an object to be exposed, thus making it difficult to function the exposure device sufficiently.

SUMMARY OF THE INVENTION

In view of the aforementioned facts, an object of the present invention is to provide an image forming device in which the emitted light is highly available, optical crosstalk is minimized, and an image can be formed at high resolution.

In order to attain the aforementioned objects, an image forming device, comprising: an exposure section including a transparent substrate, a plurality of light-emitting elements that are arranged, with a predetermined gap disposed between mutually adjacent light-emitting elements, on the transparent substrate in a main-scanning direction and include light-emitting portions using an organic material, and microlenses formed on the transparent substrate in respective correspondence to each of the light-emitting elements and having an aperture diameter that is larger than the size of the light-emitting portion of each light-emitting elements, the emitted light from the light-emitting portions of the plurality of light-emitting elements being focused by the microlens to thereby expose an object to be exposed; and an exposure control section for moving the exposure section and the object to be exposed relative to one another, and dividing exposure corresponding to one main-scanning line into a plurality of exposures in order to fill a space between positions at which images are formed by the light-emitting portions of the organic EL elements that are adjacent to each other in the main-scanning direction.

In accordance with the image forming device according to the first aspect of the present invention, in the exposure device, the emitted light from a plurality of the light-emitting elements using organic materials which are arranged in the main-scanning direction is focused on the transparent substrate by the microlens that corresponds to each light-emitting element, whereby the object to be exposed is exposed. Further, the light-emitting elements are structured such that a transparent electrode layer for operating as an anode, a light-emitting layer that emits light by the voltage being applied thereto, and an electrode layer for operating as a cathode are layered on the transparent substrate by a vapor deposition or the like.

In this exposure device, the aperture diameter of the microlens is made to be larger than the size of the light-emitting portion of the light-emitting element, whereby availability of the emitted light can be increased, and optical crosstalk can be inhibited.

In this way, when the aperture of the microlens is made larger, an array pitch of one light-emitting element becomes larger, an unexposed space is produced between positions where the light-emitting portions adjacent to each other are focused, and image resolution is deteriorated. However, the amount of this deterioration can be compensated by the exposure controller such that the exposure device and the object to be exposed are moved relatively to each other in order to fill the space to be unexposed that is produced between positions where the light-emitting portions adjacent to each other in the main-scanning direction are focused, and exposure corresponding to one main-scanning line is conducted a plurality of times, whereby exposure at high resolution, i.e., image forming at high resolution is enabled.

In accordance with a second aspect of the present invention, in the above-described image forming device, in order to arrange microlenses so as not to overlap with each other, and carry out exposure corresponding to one main-scanning line a plurality of times without being duplicated, the array pitch of the light-emitting elements is at least twice or more the size of the light-emitting portion of the light-emitting element, and the aperture diameter of the microlens is equal to or less than the array pitch.

In accordance with a third aspect of the present invention, in the above-described image forming device, as the microlens, convex lenses formed at a light-emitting side of the transparent substrate, distribution refracting lenses formed inside the transparent substrate, or a combination of the convex lenses and the distribution refracting lenses are used.

In accordance with a fourth aspect of the present invention, in the above-described image forming device, since the exposure device comprises the plurality of row elements which are formed by arranging each of the light-emitting elements corresponding to mutually different colors and forms images corresponding to a plurality of colors at one time, an image corresponding to a plurality of colors can be exposed in an amount of time required for exposing one single color. Accordingly, color image formation at higher speed becomes possible.

In accordance with a fifth aspect of the present invention according to the fourth aspect of the present invention, since at least one row of the element rows is arranged such that it is offset in the main-scanning direction with respect to other element rows, the exposure device can be made compact.

DETAILED DESCRIPTION OF THE PREFERRED EMBODIMENTS

With reference to the drawings, an example of an embodiment of the present invention will be explained in detail hereinafter.

First Embodiment

Figure 1:
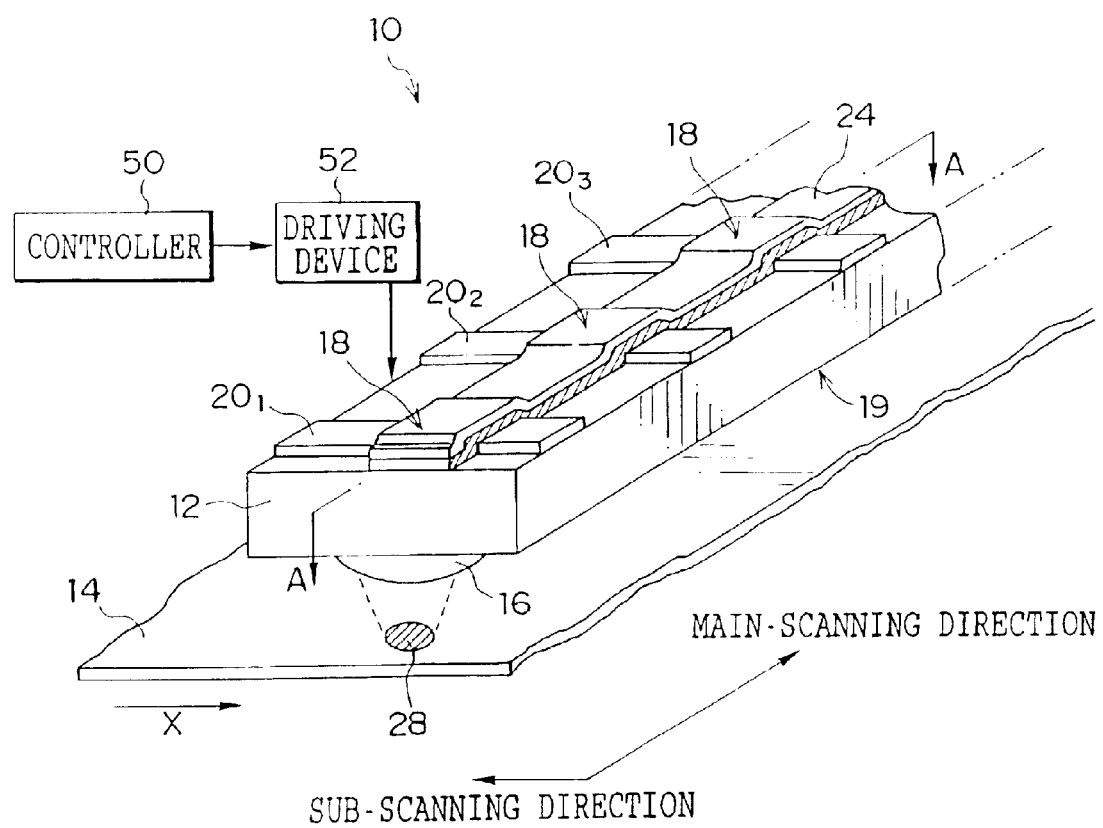
FIG. 1 is a schematic structural perspective view of an image forming device according to a first embodiment of the present invention.

FIG. 1 shows an image forming device 10 in which the present invention has been employed. As shown in FIG. 1, the image forming device 10 comprises: a transparent substrate 12; a photosensitive material 14 which is an object to be exposed; a plurality of convex microlenses 16; a microlens array having the convex microlenses 16 arranged on one surface facing the photosensitive material 14, of the transparent substrate 12 in a longitudinal direction thereof (hereinafter, "main-scanning direction"); a plurality of organic EL elements 18; and a print head 19 in which an organic EL array having the organic EL elements 18 along the main-scanning direction is formed on the other surface of the transparent substrate 12.

The print head 19 is connected to a driving device 52 which is driven on the basis of control signals outputted from a controller 50. The driving device 52 is driven, whereby the print head 19 is then movable in a main-scanning direction and a direction orthogonal to the main-scanning direction (hereinafter, a "sub-scanning direction"). Further, the controller 50 also controls emission (lighting) of the organic EL elements 18. Moreover, a conventionally known method can be used to constitute the driving device 52 for moving the print head 19, whereby a detailed description of the driving device 52 will be omitted The transparent substrate 12 can also be a plastic substrate rather than an ordinary glass substrate. The plastic substrate must have excellent heat resistance, dimensional stability, solvent resistance, electrical insulating characteristics, processability, low permeability, and low hygroscopicity. Examples of such a material include: polyethylene telephthalate, polybutylene telephthalate, polyethylene naphthalate, polystyrene, polycarbonate, polyethersulfone, polyacrylate, allyldiglycolecarbonate, polyimide, and the like.

Figure 2:
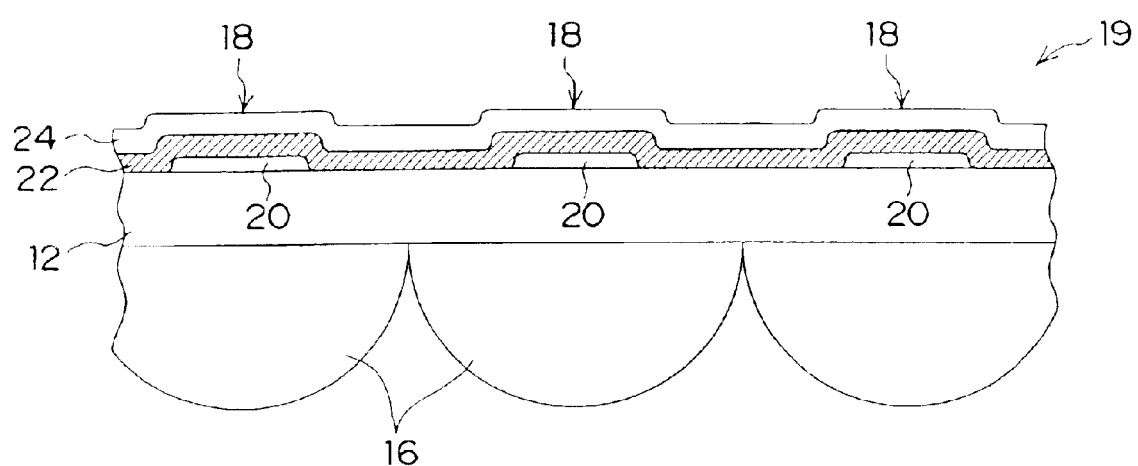
FIG. 2 is a cross-sectional view of a print head according to the first embodiment of the present invention, taken along a line A—A of FIG. 1.

As shown in FIG. 2, each organic EL element 18 for constituting the organic EL element array comprises, the transparent substrate 12 which is a common substrate, on the transparent substrate 12, are layered the transparent electrodes 20 to be used as anodes, an organic compound layer 22 including a light-emitting layer, and a metallic electrode 24 to be used as a cathode in this sequential order.

It is preferable that the transparent electrodes 20 have a light transmissivity which is at least 50% or more, and preferably 70% or more within a wavelength region of 400 to 700 nm of a visible light. As the materials for forming the transparent electrodes 20, a metallic thin film such as gold or platinum having a large work function can be used other than known compounds as transparent electrode materials such as stannic oxide, indium stannic oxide (ITO), and indium zinc oxide. Alternatively, organic compounds such as polyaniline, polythiophene, polypyrrol, or the derivatives thereof can be used.

The organic compound layer 22 can be a single layer structure merely comprising the light-emitting layer or can be a layer structure appropriately having other layers such as a hole injection layer, a hole conveying layer, an electron injection layer, an electron conveying layer, and the like, than the light-emitting layer. Examples of specific structures (represented by including electrodes) of the organic compound layer 22 include: an anode/a hole injection layer/a hole conveying layer/a light-emitting layer/an electron conveying layer/a cathode, an anode/a light-emitting layer/an electron conveying layer/a cathode, an anode/a hole conveying layer/a light-emitting layer/an electron conveying layer/a cathode, and the like. A plurality of the light-emitting layers, the hole conveying layers, and the hole injection layers can be provided.

For example, the metal electrodes 24 are preferably formed by metallic materials having low work functions: including alkali metals such as Li, and K, alkali earth materials such as Mg and Ca, and an alloy or a mixture of these metals and Ag or Al. Electrodes produced by the aforementioned materials can be further coated with Ag, Al, or Au with high work function and high electric conductivity in order to coexist storage stability and electron injection performance.

The organic EL element 18 having the above-described layer structure can be formed by using, as necessary, such a conventional method as disclosed in "Yūki EL Soshi Kaihatsu" (edited by display device research workshop for the next generation of Science Forum Inc., Jun. 30, 1992) or "Yūki EL no Totatsuten to Jitsuyōka Senryaku wo Saguru" (papers from organic electronics material workshop held at Hotel Tenbo in Ikaho Onsen in Gunma Pref., on $6^{th}$ to $8^{th}$ of July, 1995).

The transparent electrodes (anodes) 20 are provided for each of the organic EL elements 18 that are arranged in a main-scanning direction, and a plurality of anode lines $20_l$ to $20_m$ is formed on the transparent substrate 12 in accordance with the layout of the organic EL element array. The metal electrode (cathode) 24 is used as common electrodes for the organic EL elements 18 that are arranged in a main-scanning direction, and a line of cathode electrodes is formed on the transparent substrate 12 (hereinafter, the metal electrode is referred to as a "cathode line").

When a voltage is applied between the anode lines $20_l$ to $20_m$ and the cathode line 24, light is emitted from the light-emitting layer included in the organic compound layer 22 which was layered at portions where the anode lines $20_l$ to $20_m$ and the cathode line 24 intersect, and the emitted light is outputted from the transparent substrate 12 side. Further, the area of portions at which the anode lines $20_l$ to $20_m$ and the cathode line 24 intersect is changed by changing a width of each of the anode lines $20_l$ to $20_m$ and the cathode line 24, whereby the emitting portion having an arbitrary size can be formed.

Figure 3:
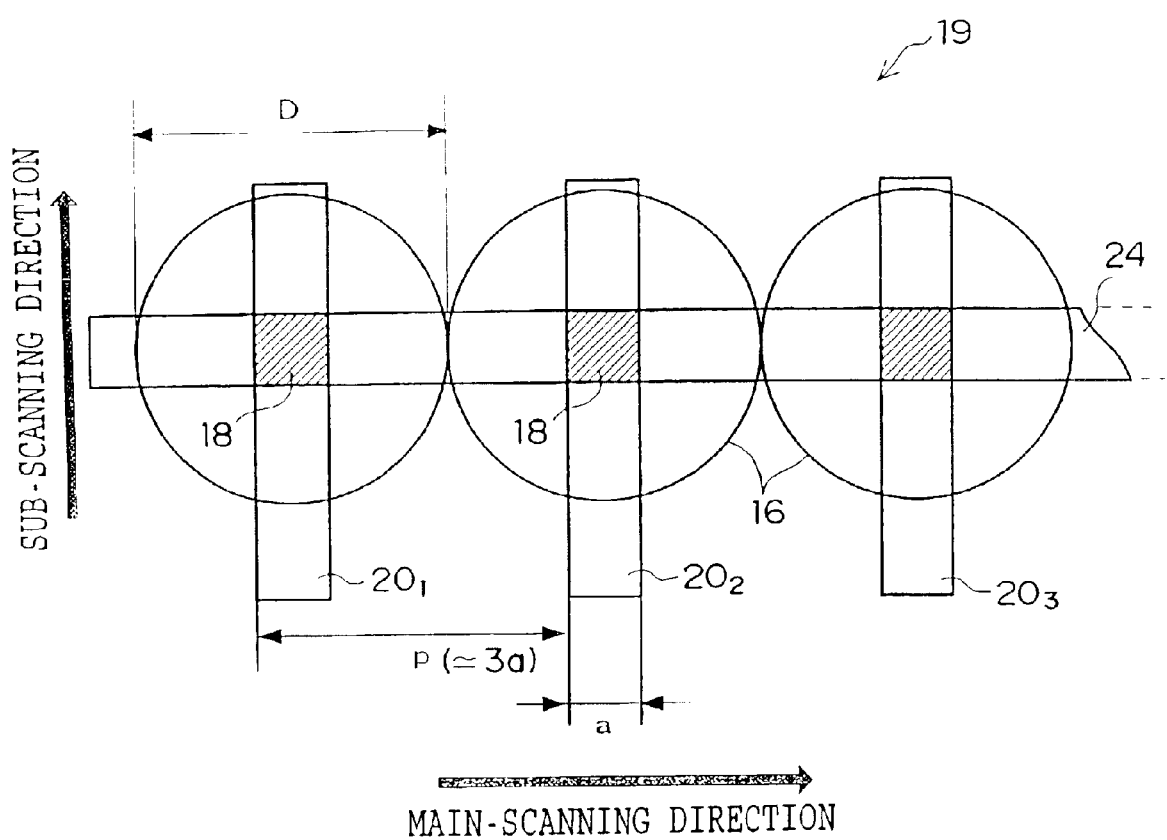
FIG. 3 is a plan view diagrammatically illustrating a layout of microlenses, organic EL elements, and electrodes of the print head according to the first embodiment of the present invention.

A relationship between an aperture diameter of each of the microlenses 16, a size of an emitting portion of each of the organic EL elements 18, and a pitch of the organic EL elements 18 will be explained hereinafter. FIG. 3 diagrammatically illustrates a layout of the microlens 16, the organic EL elements 18, the anode lines $20_l$ to $20_m$, and the cathode line 24 according to the first embodiment of the present invention.

Each of the microlenses 16 constituting a microlens array is formed so as to correspond to each organic EL element 18 by 1 to 1, and focuses light which is emitted from the organic EL element 18 on the photosensitive material 14 and forms an exposure spot 28. The aperture of the microlens 16 is made larger than the light-emitting portion of one organic EL element 18 in order to decrease the exposure spot size and inhibit optical crosstalk.

More specifically, when the size of the light-emitting portion of the organic EL element 18 in a main-scanning direction is α, an array pitch p of each organic EL element 18 is established to satisfy p≧n×α (n is an integer of 2 or more), and the micorlens 16 is formed such that an aperture diameter D has a value which is the same as p or which is slightly smaller than p.

The print head 19 has a space which is equal to or larger than the size of one organic EL element 18, between two organic EL elements adjacent to each other in the main-scanning direction. A space to be unexposed which is equal to or larger than the size of one exposure spot is supposed to be produced between the exposure spots 28 which are formed by the microlens 16 focusing the emitted light from the light-emitting portion of the organic EL elements adjacent to each other. Further, two microlenses 16 corresponding to the two organic EL elements adjacent to each other are arranged so as not to overlap with one another. A description of a case will be made hereinafter, in which the pitch p between the organic EL element 18 is almost three times the size a of the light-emitting portion (n=3).

An exposing operation of the print head 19 will be explained hereinafter. The print head 19 is connected to a controller via an unillustrated driver by which each of the organic EL elements 18 is directly modulated in accordance with image data. Further, as shown in Table 1, image data for exposing one main-scanning line is divided into three (=n) for one pixel, and converted to three divided image data A, B, and C. Numerals in round parentheses in the table indicates the order of pixels in original image data.

TABLE 1

| Divided image data A | ① | ④ | ⑦ | ⑩ | ⑬ |
| Divided image data B | ② | ⑤ | ⑧ | ⑪ | ⑭ |
| Divided image data C | ③ | ⑥ | ⑨ | ⑫ | ⑮ |

Figure 4A:
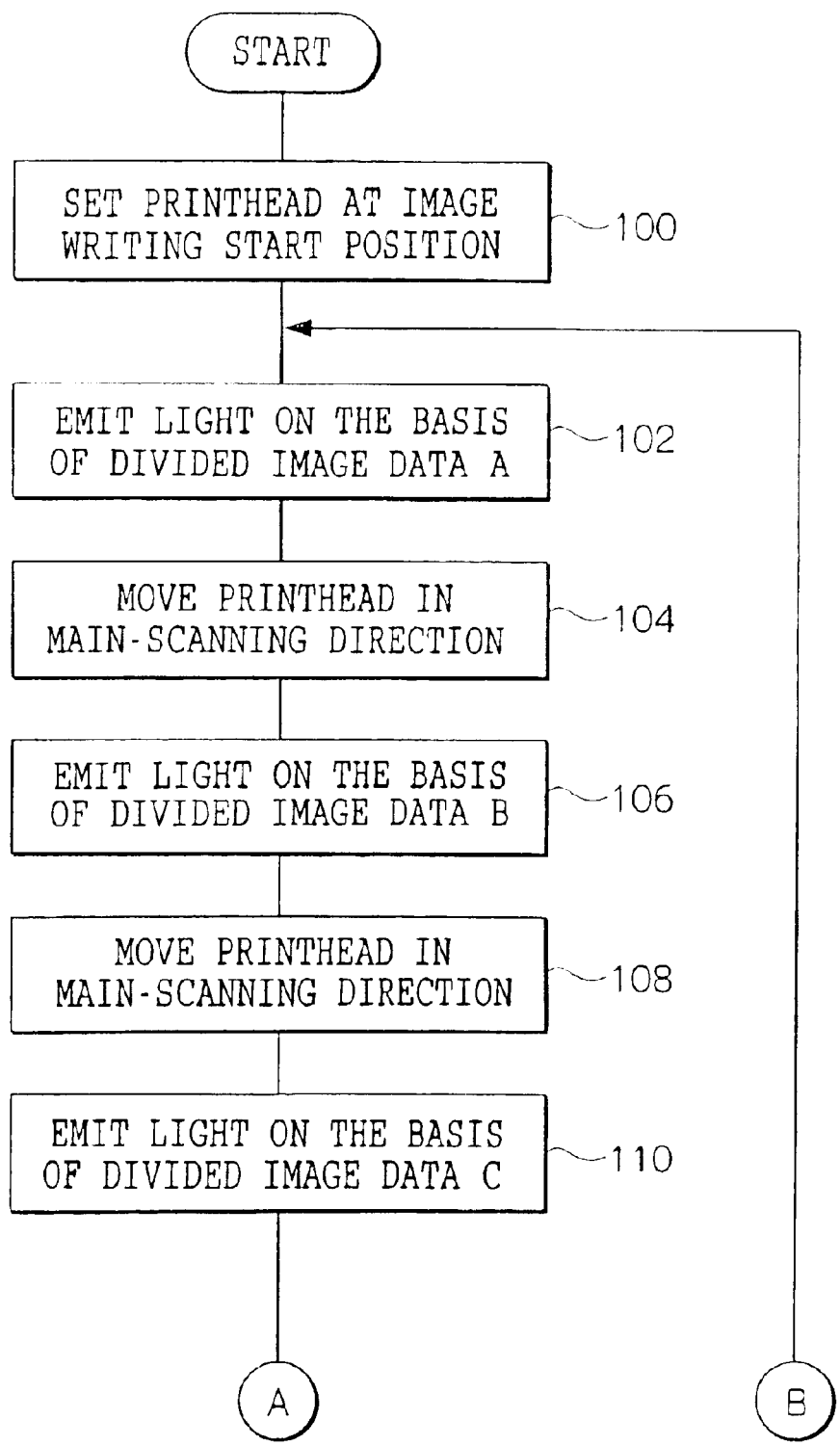
FIGS. 4A and 4B show a flow chart of a control routine which is executed for controlling the operation during image forming of the print head according to the first embodiment of the present invention.
Figure 4B:
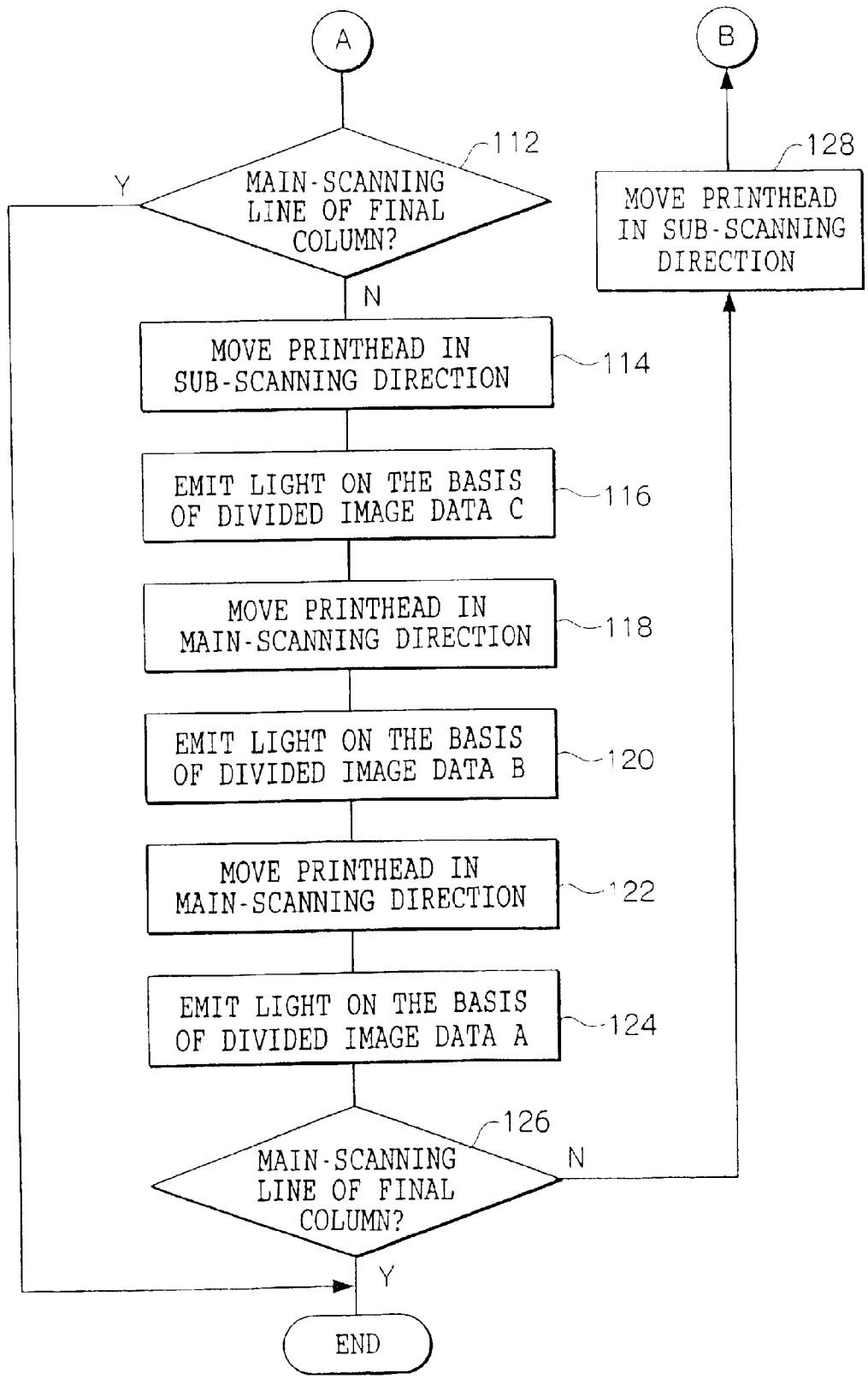
Figure 5:
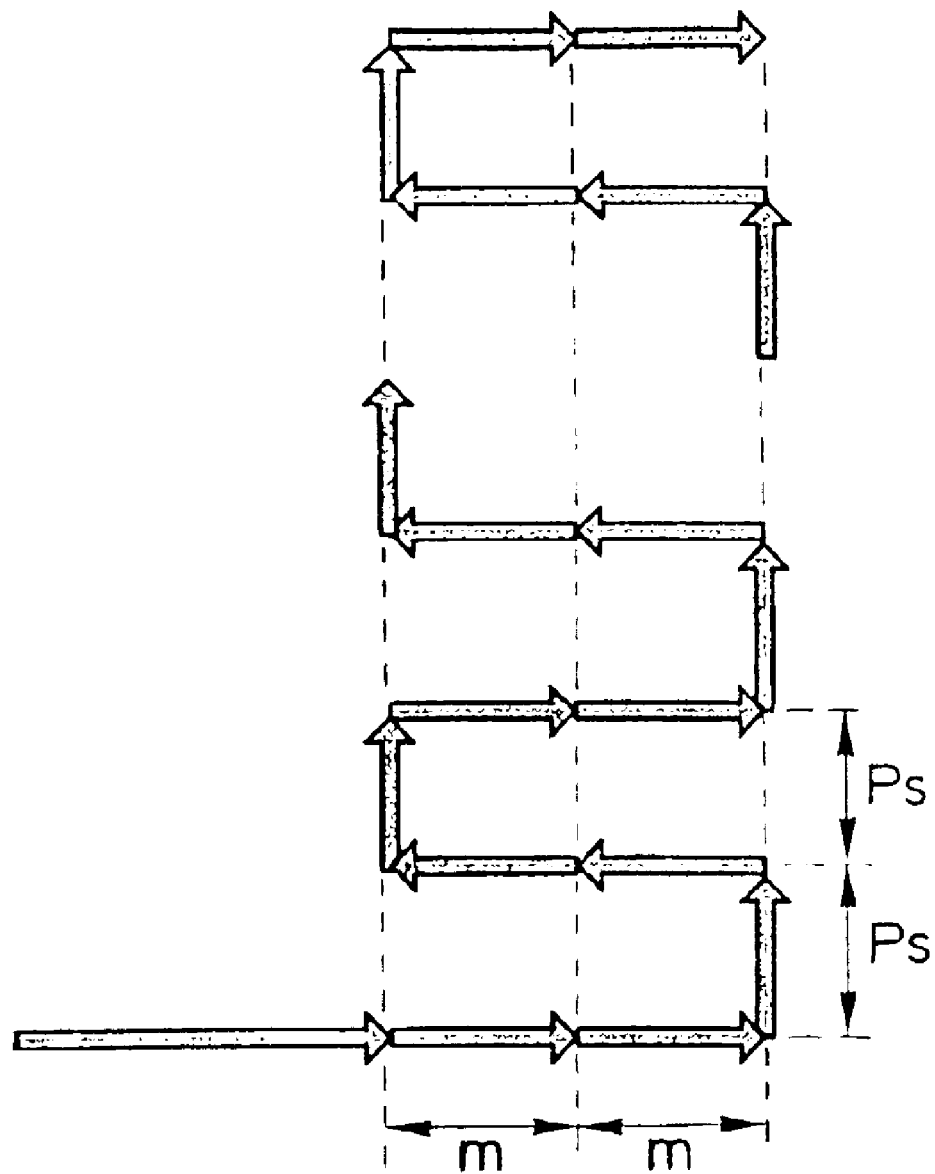
FIG. 5 is a schematic diagram of an operation in which the print head is moved by the control routine of FIG. 4.

FIG. 4 shows a control routine, which is executed by the controller 50 for controlling the print head during the image forming. Further, an operation by which the print head 19 is moved due to the control of the controller 50 is shown in FIG. 5 by arrows. As shown in FIGS. 4A and 4B, in step 100, the controller 50 transmits control signals to the driving device 52 to drive the driving device 52, move the print head 19 (see FIG. 5), and set the first organic EL element 18 put at the nearest side in the main-scanning direction (at the leftmost ends in FIGS. 1 and 3) at a position corresponding to an image recording starting position on the photosensitive material 14.

Then, in step 102, the divided image data A is transmitted to the driver, a voltage is applied to the anode lines $20_l$ to $20_m$ for respective organic EL elements 18 in accordance with the divided image data A, whereby each organic EL element 18 emits light. Therefore, each organic EL element 18 emits light in accordance with the corresponding divided image data A, the emitted light is focused on the surface of the photosensitive material 14 by the corresponding microlens 16, whereby the photosensitive material 14 is exposed. The exposure pattern at this time is ○●●○●●○●●○●●. . . , wherein an exposed pixel at this time is ○, and an unexposed pixel at this time is ●. Namely, pixels indicated by ① in Table 2 are exposed at this time.

TABLE 2

| | PIXEL ORDER | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 ... |
| Odd column | ① | ② | ③ | ① | ② | ③ | ① | ② | ③ | ① | ② | ③ |
| Even column | ③ | ② | ① | ③ | ② | ① | ③ | ② | ① | ③ | ② | ① |

In step 104, a control signal is transmitted to the driving device 52 to drive the driving device 52, and move the print head 19 in the main-scanning direction by a moving amount of m=p/3 (=p/n) (see FIG. 5). Next, in step 106, in the same manner as in the previous steps, the divided image data B is transmitted to the driver to allow each organic EL element 18 to emit light in accordance with the corresponding divided image data B. The exposure pattern of the main-scanning line at this time is ●○●●○●●○●●○●..., pixels indicated by ② in the odd column of Table 2 are exposed at this time. The exposure pattern is ○○●○○●○○●○○●... by incorporating the pixels exposed in step 102.

In the same manner as in the previous steps, in step 108, the print head 19 is moved in the main-scanning direction by a moving amount m (see FIG. 5). Next, in step 110, the divided image data C is transmitted to the driver to allow each organic EL element 18 to emit light in accordance with the corresponding divided image data C. The exposure pattern on the main-scanning line at this time is ●●○●●○●●○●●○..., pixels indicated by ③ in the odd column of Table 2 are exposed. The exposure pattern including all of the pixels exposed in steps 102 and 106 is ○○○○○○○○○○○○....

The photosensitive material 14 is exposed by moving the print head 19 in the main-scanning direction so as to fill a space formed between the positions at which the emitted light from the organic EL elements adjacent to each other are focused by the microlenses. As described above, Three-time (=n) exposure of one main-scanning line on the photosensitive material 14 does not leave any space between the positions focused by the microlens. Accordingly, an image in an amount of one main-scanning line can be written on the photosensitive material 14.

In this way, after an exposure for one main-scanning line has been completed, it is judged whether or not the main scanning line for which exposure has been completed in step 112 belongs to a final column, as shown in FIG. 4B. If it is negated, the routine proceeds to step 114 in order to conduct exposure for a subsequent main-canning line.

In step 114, the print head 19 is moved by a predetermined sub-scanning pitch Ps in the sub-scanning direction (see FIG. 5), and in step 116, the divided image data C for the next main-scanning line is transmitted to the driver thereby allowing light from the organic EL element 18 to emit in accordance with the divided image data C. The exposure pattern on the main-scanning direction at this time is ●●○●●○●●○●●○..., pixels indicated by ① in the even column of Table 2 are exposed.

In step 118, the print head 19 is moved by a moving amount m in a main-scanning direction and in a direction opposing the directions in which the print head 19 was moved in step 104 and step 108 (see FIG. 5). In the subsequent step 120, the divided image data B is transmitted to a driver to allow each organic EL element 18 to emit light in accordance with the divided image data B in the same manner as the above-description. The exposure pattern at this time is ●○●●○●●○●●○●..., pixels indicated by ② of the even column in table 2 are exposed. When the pixels that were exposed in step 116 are included, the exposure pattern is ●○○●○○●○○●○○....

In the same manner as in the precious steps, in step 122, the print head 19 is moved by the moving amount m in the main-scanning direction, i.e., the direction opposing the directions in which the print head 19 was moved in steps 104 and 108 (see FIG. 5). Next, in step 124, in the same manner as the above-description, the divided image data A is transmitted to the driver to thereby allow each organic EL element 18 to emit light in accordance with the divided image data B. The exposure pattern at this time is ○●●○●●○●●○●●..., pixels indicated by ③ in the even column of Table 2 are exposed. The exposure pattern including all of the pixels exposed in steps 116 and 120 is ○○○○○○○○○○○○.... Namely, a subsequent main-scanning line on the photosensitive material 14 is exposed three (3) times (=n) without leaving any space, whereby an image corresponding to the subsequent one main-scanning line is written on the photosensitive material 14.

Thus, after the exposure corresponding to one main-scanning line has been completed, it is judged whether or not the main scanning line for which an exposure was completed in step 126 is that that belongs to the final column. If it is negated, in order to expose the subsequent main-scanning line, in step 128, the print head 19 is moved in the sub-scanning direction by an amount of a sub-scanning pitch Ps. Thereafter, the routine returns to step 102, where the same operations as in the above-description are repeated. Main-scanning lines in the odd columns are exposed with light emitted in steps 102, 106, and 110, while main-scanning lines in the even columns are exposed with light emitted in steps 116, 120, and 124.

Figure 6:
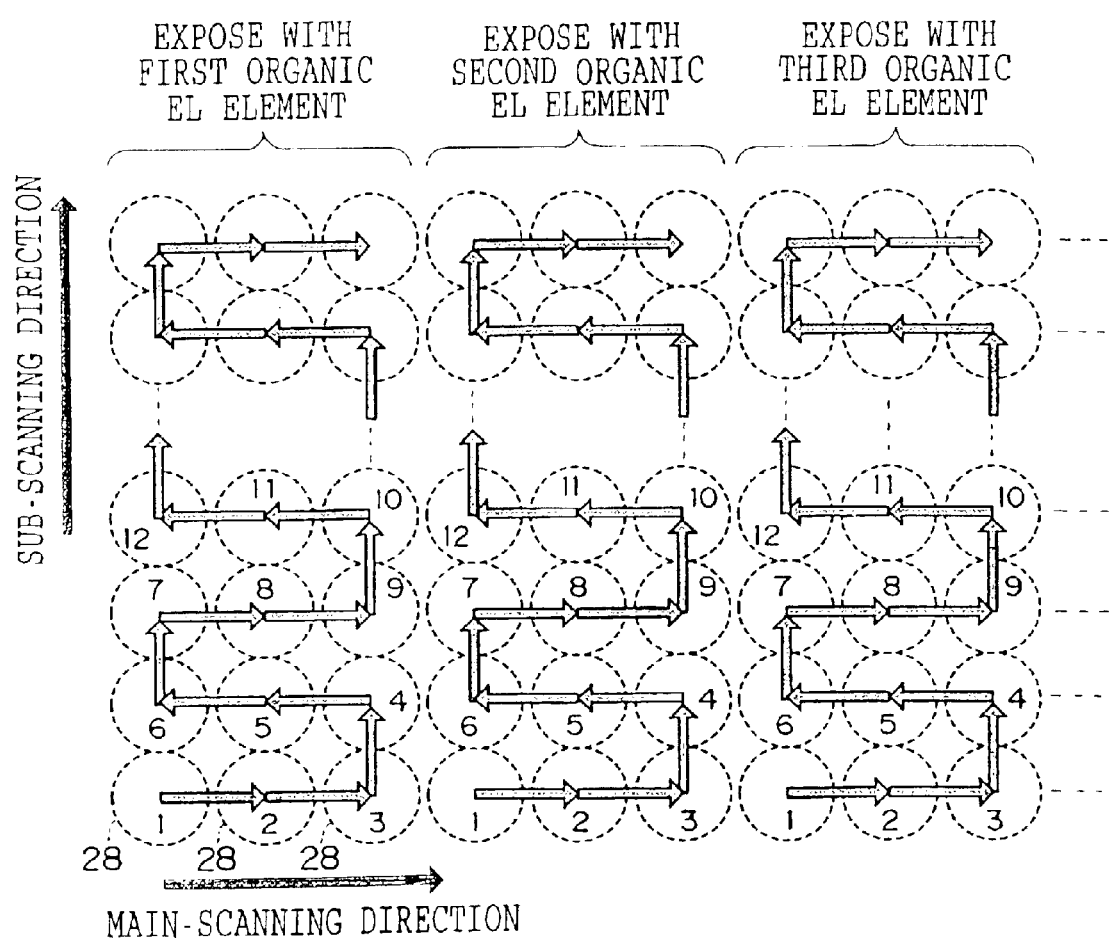
FIG. 6 is a conceptual view showing an operation in which the print head records images on a photosensitive material via the control routine of FIG. 4.

Thus, in the print head 19, the print head 19 main-scans and sub-scans by exposing the photosensitive material 14 while moving in directions indicated by arrows of FIG. 5. As shown in FIG. 6, light emitted from each organic EL element 18 is exposed onto the photosensitive material 14, whereby images can be written on the photosensitive material 14. In addition, numerals circled by dot lines showing the exposure spots 28 in FIG. 6 indicate the order of exposure due to the organic EL elements 18.

If it is judged that exposure of the main-scanning line belonging to the final column has been completed in step 112 and step 126, the entire routine is finished.

As described above, in the image forming device 10, light is emitted from each organic EL element 18 of the print head 19 on the basis of image data to thereby expose the photosensitive material 14. Thereafter, the print head 19 is moved once or more in the main-scanning direction by a predetermined moving amount m, more specifically, (n−1) times (twice in the aforementioned example), and the photosensitive material 12 is exposed for each movement. Accordingly, a space between positions (the exposure spots 28) at which the light emitted from the light-emitting portions of the organic EL elements 18 adjacent to each other are focused by the microlens 16 are filled, whereby exposure of one main scanning line on the photosensitive material 14 can be divided into a plurality of exposures, more specifically, n times (three times in the above-described example) without leaving any space.

The pitch p of the organic EL elements 18 which are arranged in the main-scanning direction of the print head 19 is made twice or more the size of the light-emitting portion of one organic EL element 18, and the aperture diameter D of one microlens 16 is formed so as to have a value which is the same as the pitch p or which is slightly smaller than the pitch p, thus making the area of the aperture larger than that of the light-emitting portion of one organic EL element 18. Consequently, the exposure spot can be reduced, sufficient exposure amount can be obtained, and optical crosstalk can be suppressed.

In other words, the larger the aperture of the microlens 16 of the print head 19, the larger the pitch p of one organic EL element 18. Namely, an amount in which image recording resolution has deteriorated is compensated by moving the print head 19 in the main-scanning direction, and exposing the photosensitive layer 12 a plurality of times so as to fill a space between positions at which the organic EL elements 18 are focused, respectively. As a result, exposure at high resolution, i.e., image writing at high resolution can be implemented.

Figure 7:
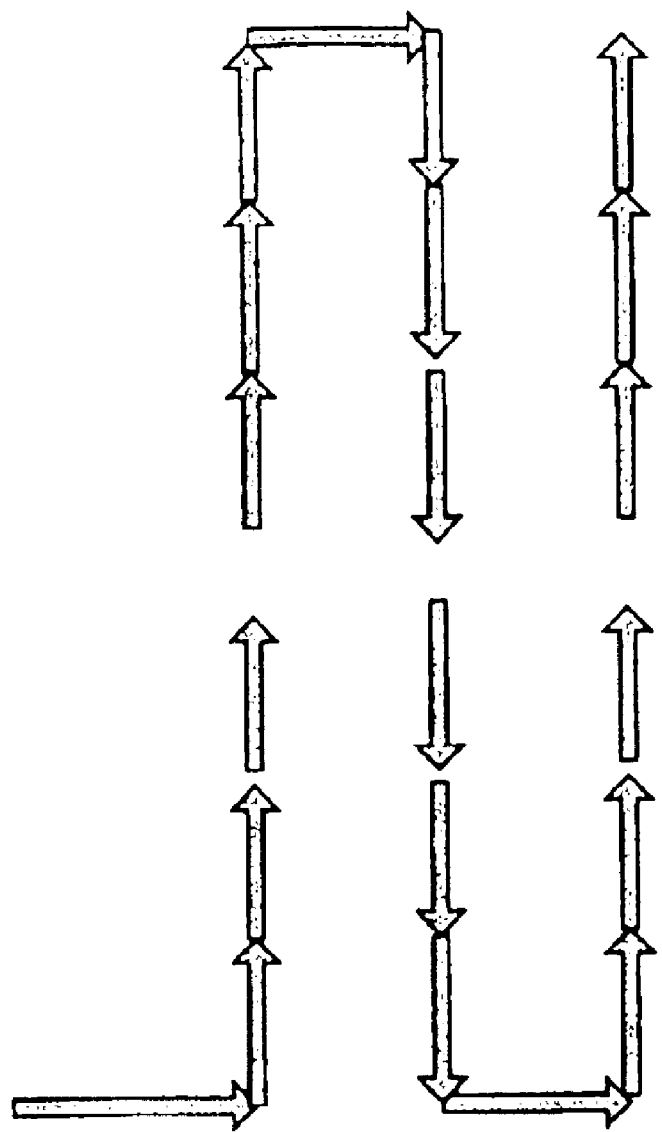
FIG. 7 is a schematic diagram illustrating a variant example of an operation in which the print head according to the first embodiment of the present invention is moved.
Figure 8:
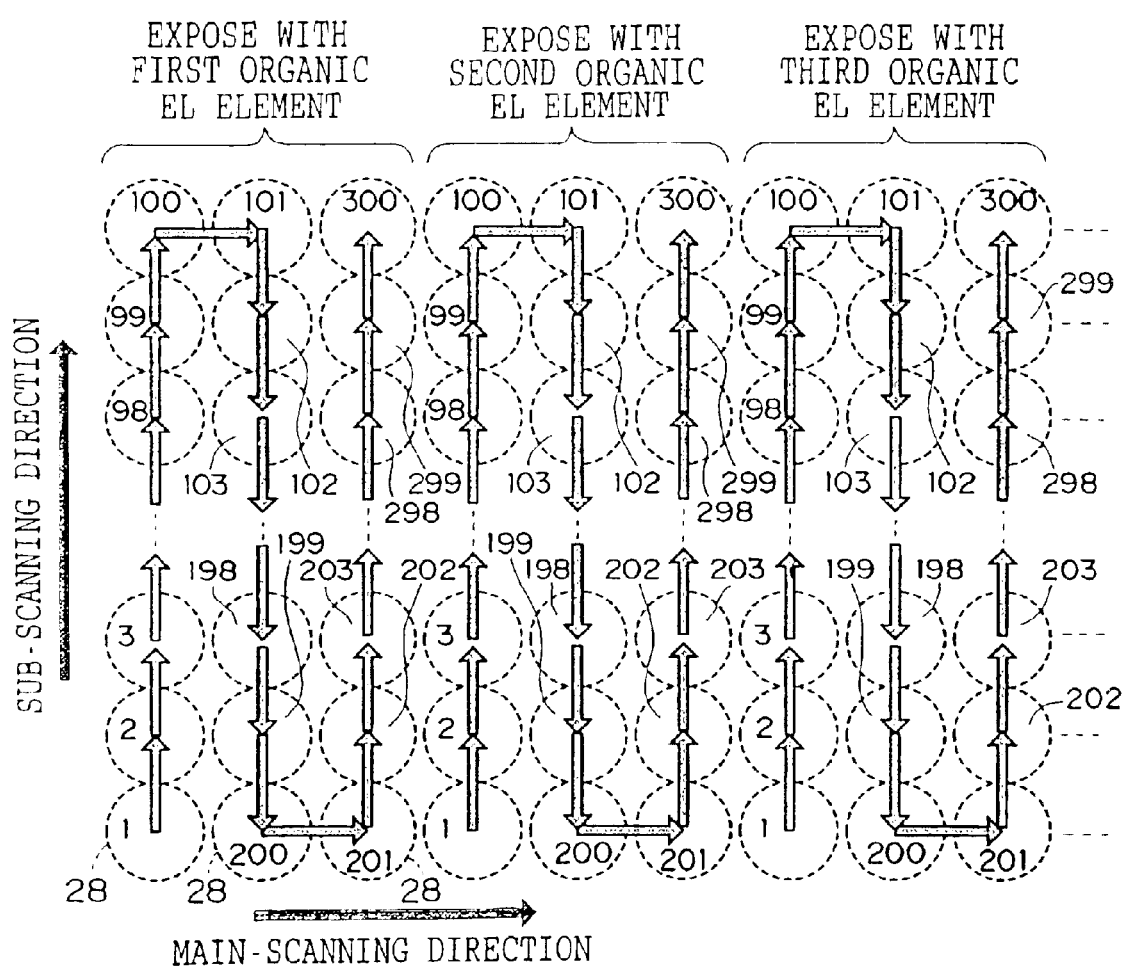
FIG. 8 is a conceptual view illustrating a variant example of an operation in which images are recorded on the photosensitive material by the print head according to the first embodiment of the present invention.

A description of an example has been made in which one main-scanning line on the photosensitive material 14 is exposed by moving the print head 19 in the main-scanning direction, and thereafter, the subsequent one main-scanning line is exposed by moving the print head 19 in the sub-scanning direction. However, the present invention is not limited to this. For example, the print head 19 can be moved as shown in FIG. 7. Namely, the print head 19 is moved in the sub-scanning direction (which is referred to as a sub-scanning forward direction) from the first column to the final column to thereby expose the photosensitive material 12, and then moved in the main-scanning direction. Thereafter, the print head 19 is moved in the sub-scanning direction inversely from the final column to the first column to expose the photosensitive material 12 in the sub-scanning backward direction, and then again moved in the main-scanning direction to thereby expose the photosensitive material 12 in the sub-scanning forward direction. Consequently, as shown in FIG. 8, the emitted light from one organic EL element 18 is exposed to thereby write an image on the photosensitive material 12. Further, numerals within round dot lines showing the exposure spot 28 of FIG. 8 indicate the order of exposure with the organic EL elements 18 when one image is formed by one main-scanning line of 100 columns.

The image forming device 10 can form not only a monochrome image by using the print head 19 but also a color image by preparing the print head 19 for each of R (red), G (green), and B (blue) colors.

Second Embodiment

In a second embodiment of the present invention, description of a case will be given next in which one single print head is used to expose each of R, G, and B colors to generate a full color print. In this case, the print head 19 is structured in the same manner as that in the first embodiment of the present invention, except that the organic EL element array comprises organic EL elements for R, G, and B three colors (hereinafter, RGB three colors), and layout of the microlenses, the organic EL elements, and the electrodes is different from that in the first embodiment of the present invention. Therefore, only different points will be explained.

Figure 9:
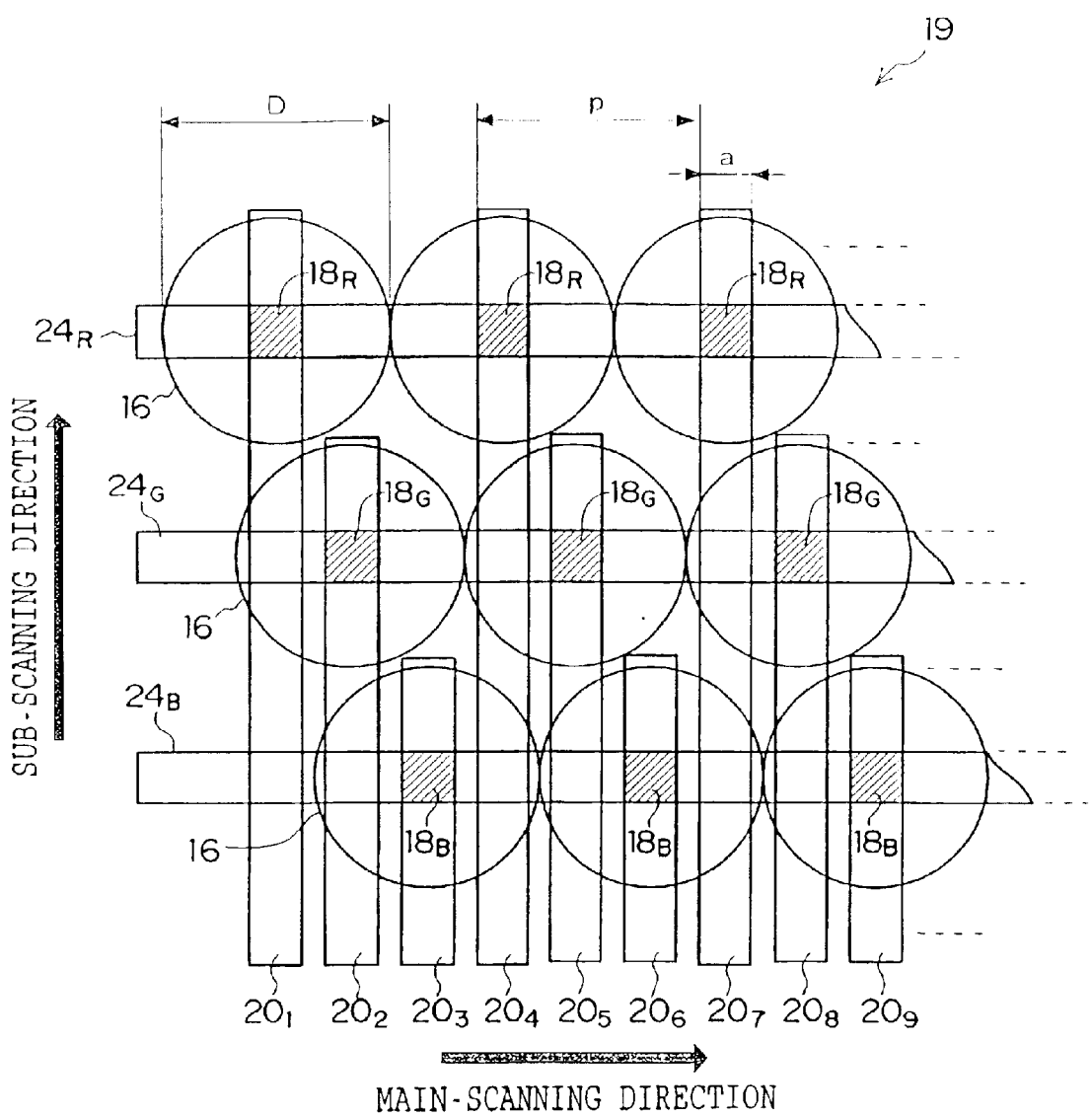
FIG. 9 is a plan view diagrammatically illustrating a layout of microlenses, organic EL elements, and electrodes of the print head according to a second embodiment of the present invention.

FIG. 9 is a schematic diagram of a layout of the microlenses, the organic EL elements, the anode lines, and the cathode lines according to the second embodiment of the present invention.

As shown in FIG. 9, the print head 19 according to the second embodiment of the present invention comprises anode lines $20_1$ to $20_m$ having three lengths (long, middle, and short) which are different from one another by a predetermined value. The anode lines $20_l$ to $20_m$ are arranged in the main-scanning direction from the anode line $20_l$ in such an order that "long, middle, and short", "long, middle, and short", . . . Namely, an anode line $20_{3i+1}$ (i=0, 1, 2, . . . ) is the longest, an anode line $20_{3i+2}$ has the middle length, and an anode lines $20_{3i+3}$ is the shortest. The print head 19 comprises total three cathode lines $24_R$, $24_G$, and $24_B$ for R, G, and B colors. The cathode lines $24_R$, $24_G$, and $24_B$ are arranged in the sub-scanning direction so as to intersect the anode lines $20_{3i+1}$, $20_{3i+2}$, and $20_{3i+3}$.

For example, R color organic EL elements 18R for forming an R color image are disposed at intersecting portions of the cathode line $24_R$ and the anode line $20_{3i+1}$, G color organic EL elements 18G for forming a G color image are disposed at intersecting portions of the cathode line $24_G$ and the anode line $20_{3i+2}$, and B color organic EL elements 18B for forming a B color image are disposed at intersecting portions of the cathode line $24_B$ and the anode line $20_{3i+3}$. The transparent electrodes 20 and the metal electrodes 24 are insulated from each other by an insulating layer (not shown) at intersecting portions of the other cathode lines and the other anode lines on which the organic EL elements 18R, 18G, and 18B are not provided. The insulating layer can be disposed on an upper layer or a lower layer of the organic compound layer 22, or can be disposed in place of the organic compound layer 22.

In FIG. 9, three rows of the organic EL elements are formed for the organic EL elements 18R, 18G, and 18B, respectively. The organic EL elements 18R, 18G, and 18B for the R, G, and B colors are arranged as being shifted from one another so that positions of the organic EL elements 18R, 18G, and 18B in the main-scanning direction do not overlap with one another. In other words, an electrode (anode line) for another color organic EL element is arranged between the same color organic EL elements 18, whereby a print head corresponding to a plurality of colors (R, G, and B colors in this case) can be made compact.

Each microlens 16 is formed so as to correspond to one organic EL element 18 by 1 to 1. By this, the pitch p (the pitch of the same color organic EL element 18) of one organic EL element 18 in an array of the organic EL element for each color becomes three times or more (n≧3) the size α of the light-emitting portion of the organic EL element 18 in the main-scanning direction thus allowing the aperture diameter D of the microlens 16 to be three times or more the size a of the light-emitting portion of the organic EL element 18 in the main-scanning direction (about three time in FIG. 9).

The print head 19 thus structured is used and controlled in the same manner as that in the first embodiment of the present invention, whereby effects similar to those in the first embodiment of the present invention can be obtained, and a plurality of color prints three colors of R, G, and B in this case) can be printed at one time in almost the same amount of time as that taken for carrying out one single color print. Further, in this case, in order to prevent misalignment of the organic EL elements 18 for each color, it is needless to say that image data must be shifted for each color and then outputted.

Figure 10:
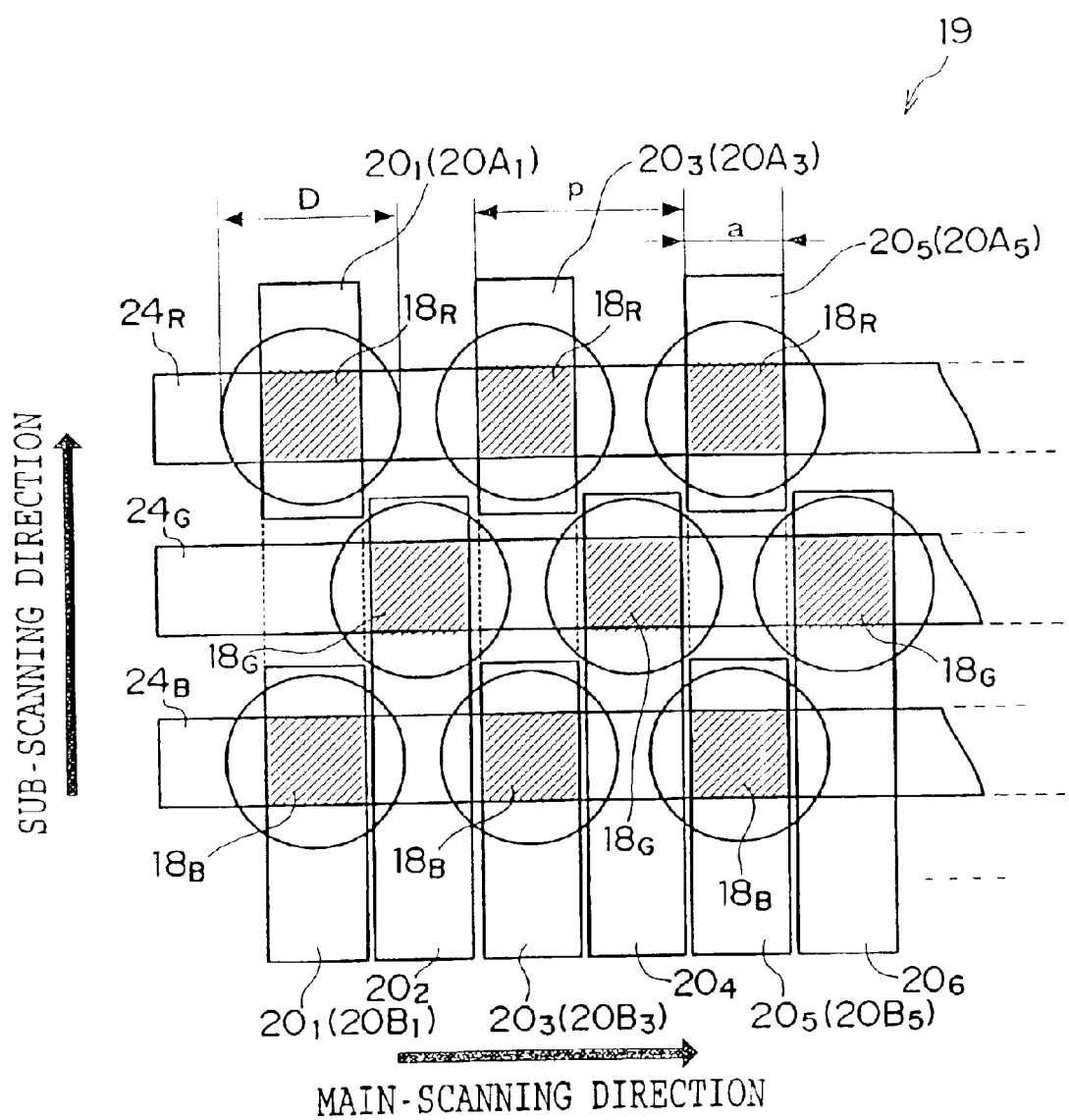
FIG. 10 is a plan view diagrammatically illustrating a variant example of a layout of microlenses, organic EL elements, and electrodes of the print head according to the second embodiment of the present invention.

A description of a case of n≧3 has been given in the above-description. However, in a case of n=2, the print head 19 can be structured as shown in a variant example of FIG. 10. Namely, as shown in FIG. 10, in the same manner as in FIG. 9, the total three cathode lines $24_R$, $24_G$, and $24_B$ are respectively formed for the R, G, and B colors, and arranged in the sub-scanning direction so as to be spaced apart from one another at a predetermined gap. Among the anode lines $20_l$ to $20_m$, an anode line $20_{k+1}$(k=0, 1, 2, . . . ) is separated into two anode lines $20A_{k+1}$ and $20B_{k+1}$, so as not to intersect the cathode line $24_G$, while an anode line $20_{k+2}$ is shortly terminated so as not to intersect the cathode line $24_R$.

The organic EL elements 18R are disposed at intersecting portions of the cathode lines $24_R$ and the anode lines $20A_{k+1}$, the organic EL elements 18G are disposed at intersecting portions of the cathode lines $24_G$ and the anode lines $20_{k+2}$, and the organic EL elements 18B are disposed at intersecting portions of the cathode lines $24_B$ and the anode lines $20B_{k+1}$. In the same manner as the above-description, the transparent electrodes 20 and the metal electrodes 24 are insulated from each other by the insulating layer (not shown) at the intersecting portions of the other cathode lines and the other anode lines on which the organic EL elements 18R, 18G, and 18B are not provided.

With respect to the organic EL elements 18, in FIG. 10, total three rows of organic. EL element arrays are formed respectively for the organic EL elements 18R, the organic EL elements 18G, and the organic EL elements 18B. The organic EL elements 18R and 18B are arranged at the same position in the main-scanning direction, while the organic EL elements 18G are arranged as being shifted from the organic EL elements 18R and 18B so as not to overlap the organic EL elements 18R and 18B in the main-scanning direction. Namely, as a whole, the organic EL elements 18R, the organic EL elements 18G, and the organic EL elements 18B are arranged as being shifted from one another at a predetermined gap in the sub-scanning direction. The organic EL elements 18R and 18B, and the organic EL element 18G are alternately arranged in the main-scanning direction. One microlens 16 is formed so as to correspond to one organic EL element 18 by 1 to 1.

Accordingly, the pitch p of the organic EL elements 18 of the same color in the main-scanning direction is twice or more ($n \geq 2$) the size a of the light-emitting portion of each organic EL element 18, and the aperture diameter D of the microlens 16 is almost twice the size a of the light-emitting portion of the organic EL element 18. Further, the organic EL element 18R and 18B are arranged on the same anode line $20_{k+1}$. However, the anode line $20_{k+1}$ is separated into two anode lines $20A_{k+1}$ and $20B_{k+1}$, whereby the organic EL element 18R and 18B can be controlled separately.

Even in the case of n=2, the print head 19 thus structured can exhibit effects in the same manner as those in the first embodiment of the present invention. Three-color printing can be carried out at one time in almost the same amount of time as that taken for carrying out one color printing. Further, the structure shown in FIG. 10 can be adopted in the case of $n \geq 3$.

In the first and second embodiments of the present invention, examples in which a convex microlens is provided on the surface of the substrate has been explained. However, a distribution refracting lens such as Selfoc lens (Trade name), to which converging characteristics have been applied by forming reflectance distribution inside the substrate by ion implantation, can be used as a microlens. Further, the convex lens formed on the surface of the substrate and the distribution refracting lens formed inside the substrate can be combined and used as a microlens, whereby a microlens whose aperture number (NA) is larger can be obtained.

An example has been described in which the position of the photosensitive material is fixed to move the print head in the main-scanning direction and the sub-scanning direction. However, since the present invention can be accomplished by moving the print head and the photosensitive material relatively to each other in the main-scanning direction and the sub-scanning direction, the photosensitive material can be moved in the main-scanning direction or the sub-scanning direction, while the print head can be moved in the sub-scanning direction or the main-scanning direction. Further, the print head can be fixed to move the photosensitive material in the main-scanning direction or in the sub-scanning direction.

In the above-described first through third embodiments of the present invention, an example in which each organic EL element of the exposure head is modulated directly by the driver has been described. However, the organic EL element is used as back light, and is modulated externally and exposed by using shutter arrays such as filters and liquid crystal shutter array, and PLZT (composed oxides such as zinc, lantern, zirconium, and titanium) optical shutter array to form an image.

What is claimed is:

1. An image forming device, comprising:
   an exposure section including
      a transparent substrate,
      a plurality of light-emitting elements that are arranged, with a predetermined gap disposed between mutually adjacent light-emitting elements, on the transparent substrate in a main-scanning direction and include light-emitting portions using an organic material, and
      microlenses formed on the transparent substrate in respective correspondence to each of the light-emitting elements and having an aperture diameter that is larger than the size of the light-emitting portion of each light-emitting element, the emitted light from the light-emitting portions of the plurality of light-emitting elements being focused by the microlens to thereby expose an object to be exposed; and
   an exposure control section for moving the exposure section and the object to be exposed relative to one another, and dividing exposure corresponding to one main-scanning line into a plurality of exposures in order to fill a space between positions at which images are formed by the light-emitting portions of the organic EL elements that are adjacent to each other in the main-scanning direction.

2. The device of claim 1, wherein an array pitch of the plurality of the light-emitting elements is at least twice the size of each of the light-emitting portions of the light-emitting elements, and the aperture diameter of the microlens is equal to or less than the array pitch.

3. The device of claim 2, wherein the microlenses are one of convex lenses formed at a light-emitting side of the transparent substrate, distribution refracting lenses formed inside the transparent substrate, and a combination of the convex lenses and the distribution refracting lenses.

4. The device of claim 3, wherein the plurality of the light-emitting elements belong to any one of a plurality of element rows, the light-emitting elements belonging to each row of the plurality of the element rows are arranged in the main-scanning direction and correspond to the same color, and two elements belonging to two different element rows of the plurality of element rows correspond to mutually different colors, whereby images corresponding to plural colors are exposed at one time by the exposure section.

5. The device of claim 4, wherein at least one element row of the plurality of the element rows is arranged such that it is offset in the main-scanning direction with respect to other element rows.

6. The device of claim 2, wherein the plurality of the light-emitting elements belong to any one of a plurality of element rows, the light-emitting elements belonging to each row of the plurality of the element rows are arranged in the main-scanning direction and correspond to the same color, and two elements belonging to two different element rows of the plurality of element rows correspond to mutually different colors, whereby images corresponding to plural colors are exposed at one time by the exposure section.

7. The device of claim 6, wherein at least one element row of the plurality of the element rows is arranged such that it is offset in the main-scanning direction with respect to other element rows.

8. The device of claim 1, wherein the microlenses are one of convex lenses formed at a light-emitting side of the transparent substrate, distribution refracting lenses formed inside the transparent substrate, and a combination of the convex lenses and the distribution refracting lenses.

9. The device of claim 8, wherein the plurality of the light-emitting elements belong to any one of a plurality of element rows, the light-emitting elements belonging to each row of the plurality of the element rows are arranged in the main-scanning direction and correspond to the same color, and two elements belonging to two different element rows of the plurality of element rows correspond to mutually different colors, whereby images corresponding to plural colors are exposed at one time by the exposure section.

10. The device of claim 9, wherein at least one element row of the plurality of the element rows is arranged such that it is offset in the main-scanning direction with respect to other element rows.

11. The device of claim 1, wherein the plurality of the light-emitting elements belong to any one of a plurality of element rows, the light-emitting elements belonging to each row of the plurality of the element rows are arranged in the main-scanning direction and correspond to the same color, and two elements belonging to two different element rows of the plurality of element rows correspond to mutually different colors, whereby images corresponding to plural colors are exposed at one time by the exposure section.

12. The device of claim 11, wherein at least one element row of the plurality of the element rows is arranged such that it is offset in the main-scanning direction with respect to other element rows.

13. The image forming device of claim 1, wherein the plurality of light emitting elements comprises a transparent electrode.

14. The image forming device of claim 13, wherein each of the plurality of light emitting elements comprises a discrete transparent electrode coupled to the transparent substrate.

15. An image forming device, comprising:
    an exposure section including
        a transparent substrate,
        a plurality of sets of linear anodes of a predetermined number of types, the linear anodes having different lengths and being arranged parallel to one another in a direction orthogonal to a main-scanning direction, with a first predetermined gap disposed between mutually adjacent linear anodes, linear cathodes that are arranged in the main-scanning direction, with a second predetermined gap disposed between mutually adjacent linear anodes, the number of linear anodes being at least equal to the predetermined number of types of linear anodes,
        a plurality of light-emitting elements, each of which is formed at an intersection between one of the anodes and one of the cathodes by interposing an organic material between the anode and the cathode, and
        microlenses formed on the transparent substrate in respective correspondence to each of the light-emitting elements and having an aperture diameter that is larger than the size of each of the light-emitting elements, the emitted light from the light-emitting portions of the plurality of light-emitting elements being focused by the microlens to thereby expose an object to be exposed; and
    an exposure control section for moving the exposure section and the object to be exposed relative to one another, and dividing exposure corresponding to one main-scanning line into a plurality of exposures in order to fill a space between positions at which images are formed by the light-emitting portions of the organic EL elements that are adjacent to each other in the main-scanning direction.

16. The device of claim 15, wherein light-emitting elements that are formed at portions where anodes of the same type and one of the plurality of the cathodes intersect correspond to one color, while light-emitting elements that are formed at portions where anodes of the other type and one of the plurality of the cathodes intersect correspond to another color.

* * * * *